US012637068B2

(12) United States Patent
Le et al.

(10) Patent No.: US 12,637,068 B2
(45) Date of Patent: May 26, 2026

(54) SAFETY CONTROL SYSTEM IN NARROW ROADS FOR SELF-DRIVING DELIVERY VEHICLES

(71) Applicant: ALPHA ASIMOV ROBOTICS COMPANY LIMITED, Da Nang City (VN)

(72) Inventors: Anh Son Le, Ha Noi City (VN); Duy Hung Nguyen, Uong Bi City (VN)

(73) Assignee: ALPHA ASIMOV ROBOTICS COMPANY LIMITED, Da Nang City (VN)

( * ) Notice: Subject to any disclaimer, the term of this patent is extended or adjusted under 35 U.S.C. 154(b) by 104 days.

(21) Appl. No.: 18/591,614

(22) Filed: Feb. 29, 2024

(65) Prior Publication Data

US 2024/0351580 A1     Oct. 24, 2024

(30) Foreign Application Priority Data

Apr. 20, 2023     (VN) .............................. 1-2023-02620

(51) Int. Cl.
| | |
|---|---|
| *B60W 30/09* | (2012.01) |
| *B60Q 9/00* | (2006.01) |
| *B60W 30/095* | (2012.01) |
| *B60W 30/18* | (2012.01) |

(Continued)

(52) U.S. Cl.
CPC ............. *B60W 30/09* (2013.01); *B60Q 9/008* (2013.01); *B60W 30/0956* (2013.01); *B60W 30/18154* (2013.01); *B60W 30/18159* (2020.02); *B60W 50/0097* (2013.01); *B60W 60/0015* (2020.02); *B60W 60/00256* (2020.02);

*B60W 2420/403* (2013.01); *B60W 2420/408* (2024.01); *B60W 2420/54* (2013.01); *B60W 2554/20* (2020.02);

(Continued)

(58) Field of Classification Search
CPC ............. B60W 30/09; B60W 60/0015; B60W 30/18159; B60W 60/00256; B60W 30/0956; B60W 30/18154; B60W 50/0097; B60W 2554/20; B60W 2554/4041; B60W 2554/80; B60W 2554/4045; B60W 2420/408; B60W 2420/403; B60W 2420/54; B60Q 9/008
See application file for complete search history.

(56) References Cited

U.S. PATENT DOCUMENTS

| | | | | |
|---|---|---|---|---|
| 12,291,236 B1 * | 5/2025 | Akman | ............. | B60W 60/0015 |
| 12,296,852 B1 * | 5/2025 | Zwiener | .......... | B60W 60/00184 |

(Continued)

*Primary Examiner* — Mohamad O El Sayah
(74) *Attorney, Agent, or Firm* — patenttm.us

(57) ABSTRACT

A safety control system for self-driving vehicles when traveling in narrow roads with blind turns. The system has features to avoid collision when moving, predict traffic situations at blind turns and assist steering, and warn about safety when traveling in narrow roads. The collision avoidance feature of the surrounding environment when moving is performed based on the signals of the lidar sensors, ultrasonic distance sensors and the cameras on the vehicle. The feature of predicting the situation at the turn based on sound and light signals as the vehicle approaches the turn. The steering assist feature helps to follow the scenario corresponding to the vehicle's prediction when the turn is reached, and provides warning signals such as lights and horns in accordance with traffic situations.

4 Claims, 2 Drawing Sheets

(51) Int. Cl.
    *B60W 50/00*         (2006.01)
    *B60W 60/00*         (2020.01)
(52) U.S. Cl.
    CPC ............... *B60W 2554/4041* (2020.02); *B60W 2554/4045* (2020.02); *B60W 2554/80* (2020.02)

(56)              References Cited

U.S. PATENT DOCUMENTS

| | | | |
|---|---|---|---|
| 2015/0057891 A1* | 2/2015 | Mudalige | B60W 10/18 |
| | | | 701/42 |
| 2015/0202770 A1* | 7/2015 | Patron | G06Q 50/01 |
| | | | 901/50 |
| 2017/0336795 A1* | 11/2017 | Wei | B60W 30/0956 |
| 2020/0094757 A1* | 3/2020 | Murray | B60K 28/04 |
| 2021/0061269 A1* | 3/2021 | Petroff | B60W 30/18159 |
| 2021/0103747 A1* | 4/2021 | Moustafa | G06F 18/25 |
| 2023/0298198 A1* | 9/2023 | Cserna | G06T 7/70 |

\* cited by examiner

SAFETY CONTROL SYSTEM IN NARROW ROADS FOR SELF-DRIVING DELIVERY VEHICLES

BACKGROUND OF THE INVENTION

The present invention provides a safety control system for self-driving vehicles when traveling in narrow roads. This system helps the car move more conveniently, safely and reach more people.

BACKGROUND ART

The patent application US2015202770A1 offers a self-driving delivery vehicle system that can move on pedestrian sidewalks. However, the range of movement of the vehicle is still limited when the vehicle cannot reach narrow roads, alleys, where there are no walking sidewalks.

U.S. Pat. No. 10,578,447B2 offers a delivery vehicle design that can move on ordinary roads and can identify safe paths, methods of safe crossing. However, the invention does not mention the method of moving in small roads, narrow alleys, intersections out of sight. In such environments, a safety method is needed to limit the likelihood of accidents, thereby expanding the vehicle's customer reach.

BRIEF SUMMARY OF THE INVENTION

This invention provides a narrow road safety control system for self-driving delivery vehicles consisting of: hardware consisting of an embedded computer connected to a sensor system that helps the vehicle identify its surroundings and lights and horns to help the vehicle warn other vehicles safely; the sensor system includes ultrasonic distance sensors, lidar scanning sensors, at least two stereo cameras, and sound sensors; Ambient safety control software allows the vehicle to know important information about its surroundings, including navigable road area, position of surrounding objects, velocity of objects participate in traffic and predict the direction of movement of these objects; when detecting objects with a small distance and the objects cannot be avoided, the system will immediately stop the vehicle; with static obstacles, the vehicle will recognize and avoid from a distance; with obstacles or vehicles appearing suddenly at a close distance, the safety system will also give a steering signal to the steering system to avoid a collision; the safety system works independently of steering system; the embedded software predicts the traffic situation at the out of sight intersection. Objects moving near a blind turn are predicted based on the sounds and lights that the object emits; this prediction is verified when the vehicle begins to enter the turn using images from cameras and ultrasonic distance sensors; The software supports safe driving for the main driving algorithm when traveling in narrow roads, including the function of supporting steering and speed control, issuing warning signals with lights or horns when approaching the turn; in case at the turn, the predicted situation is wrong, the software proactively makes more appropriate decisions to ensure traffic safety; when the vehicle stops for delivery at the delivery point, the vehicle stops close to the curb and turns on flashing lights to warn other traffic vehicles that the vehicle is not moving.

DETAIL DESCRIPTION OF THE INVENTION

The invention described in detail below is based on accompanying drawings, which are intended to illustrate variations of the present invention without limiting the scope of the patent.

Figure 1:
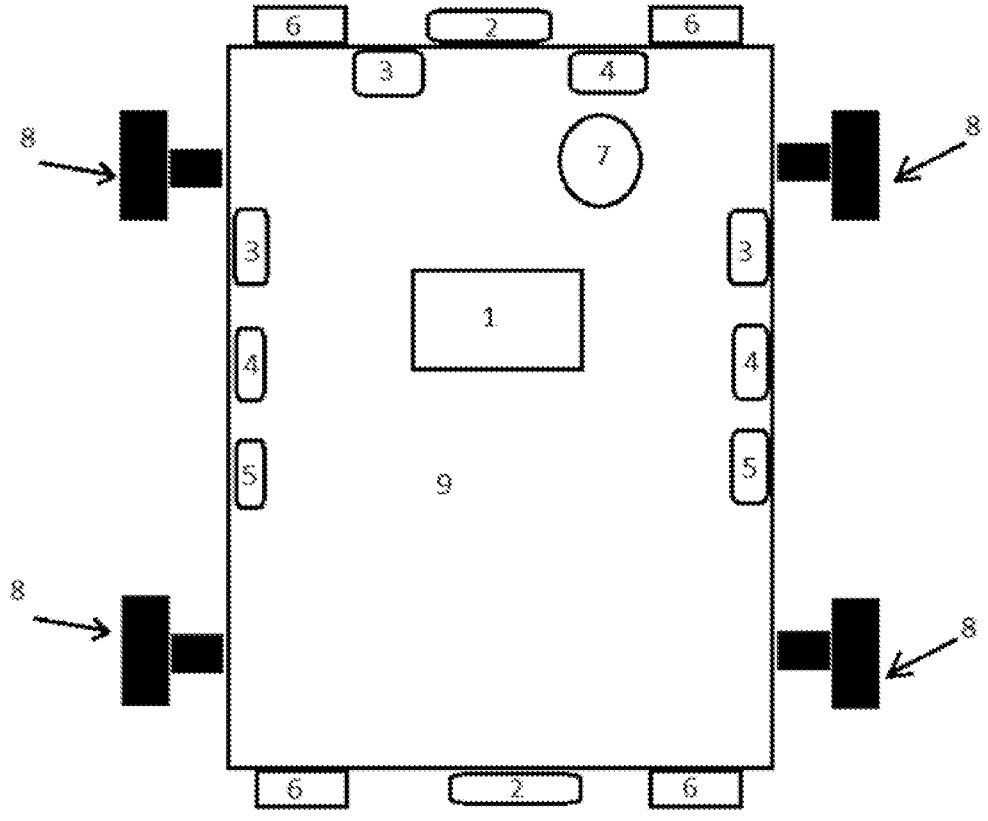
FIG. 1 is the layout of the hardware components of the safety control system for the vehicle when traveling in a narrow road according to this invention.
Figure 2:
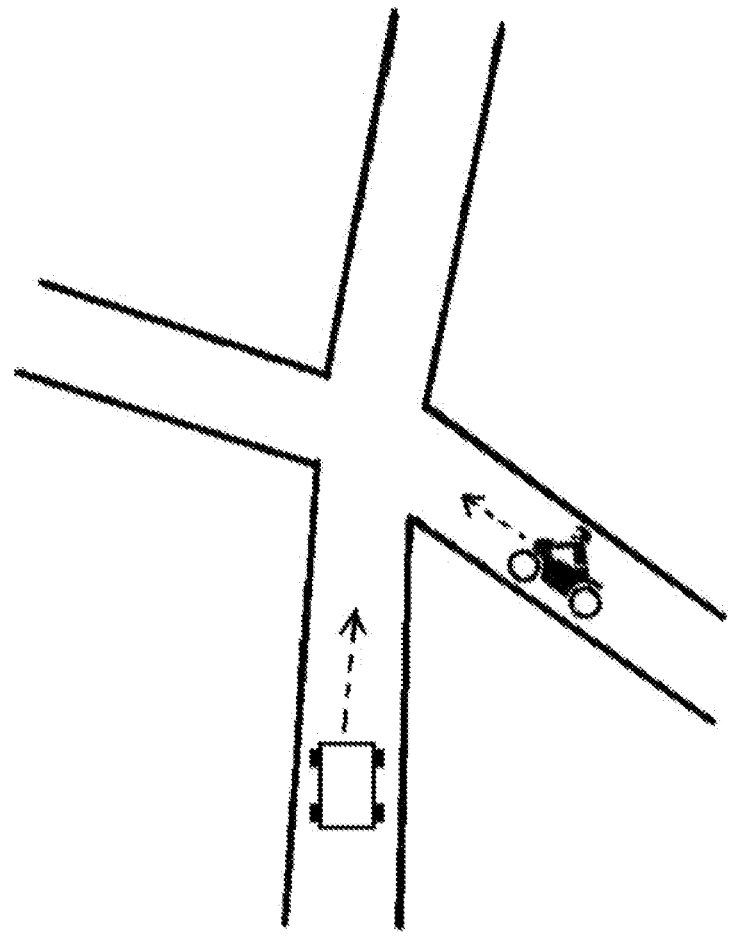
FIG. 2 is an illustration of a traffic situation in a narrow alley with out of sight intersection According to FIG. 1, the hardware of the safety control system for vehicles when moving in narrow roads includes the following components: 1—Embedded computer, 2—stereo camera, 3—lidar sensor, 4—ultrasonic distance sensor, 5—sound sensor, 6—warning light, 7—horn. In addition, 8 and 9 are the wheel and body of the vehicle, respectively.

At intersections in narrow alleys, out of sight, there is a potential risk of traffic safety because vehicles can move fast and crash into each other. According to this invention, when approaching an invisible intersection, the vehicle predicts the object (in the FIG. 2 is a motorbike) and the speed of movement based on the sound and light emitted.

According to the first aspect, the present invention provides a safety control system for a self-driving delivery vehicle when moving in narrow road consisting of:

the hardware includes an embedded computer connected to a sensor system that helps the vehicle determine its surroundings, lights and horns that help the vehicle emit warning signal to other vehicles;

software for safe control of 3D space surroundings;

software to predict traffic situations at intersections that are out of sight;

safe driving support software for the main driving algorithm when traveling in narrow roads;

the software that sends out a warning signal when the vehicle stops for delivery or comes to a turn.

The first feature of the narrow road safety control system for this self-driving delivery vehicle is that the hardware includes an embedded computer connected to a sensor system and lights and horns. The sensor system helps the vehicle recognize the surrounding environment. Lights and horns help the vehicle provide warning signal to other vehicles. The sensor system includes ultrasonic distance sensors, lidar scanning sensors, at least two stereo cameras, and sound sensors. Sensors help the vehicle identify, determine the surrounding environment, moving conditions, predict moving objects at the blind turn, in addition, horns and lights help the vehicle warn other vehicles, the embedded computer is responsible for running software that recognizes the surrounding space and predicts traffic situations at blind turns.

The second feature of the narrow road safety control system for this self-driving delivery vehicle is the 3D ambient safety control software that allows the vehicle to know important information about the surrounding environment, including the area which the vehicle can travel, the location of surrounding objects, the speed of objects in traffic, and the predicted direction of their movement; when detecting objects with a small distance that cannot be avoided, the system will immediately stop the vehicle; with static obstacles, the vehicle will recognize and avoid from a distance; With obstacles or vehicles appearing suddenly at a close distance, the software will also give a steering signal; the safety software works independently of main self-driving software and it has higher priority to ensure traffic safety;

The third feature of the narrow road safety control system for self-driving delivery vehicle is the software that predicts the traffic situation at an out-of-sight turn, object moving near a blind turn is predicted based on the sounds and lights it emits; this prediction is verified when the vehicle begins to enter the intersection using images from cameras and ultrasonic distance sensors; The signals from sound sensors and the images from cameras are processed by a deep learning algorithm to predict the moving object near the turn that is hidden from view, so the vehicle can predict the traffic situation at the turn.

The fourth feature of the narrow road safety control system for this self-driving delivery vehicle is the safety steering assist feature for the main driving software which includes the function of assisting steering and speed control, issuing warning signals by lights or horns when approaching a turn; in case at the turn, the predicted situation is wrong, the software actively makes decisions in accordance with reality to ensure traffic safety; the appropriate speed and steering angle are calculated, if necessary, the vehicle can fully brake to give way to moving objects at the turn.

The fifth feature of the narrow road safety control system for this self-driving delivery vehicle is software that warns other vehicles when the vehicle is coming to a stop for delivery; This function makes the transportation and delivery process safer, helps other vehicles pay attention to avoid hitting the vehicle.

According to the next aspect, this invention provides a narrow road safety control system for self-driving delivery vehicles in which the sensors used in the system include:

Sound sensor: provides signals to predict hidden object, distance to turn, speed and direction of travel when vehicle approaches a blind turn based on analysis of sound type and its change;

Front camera cluster: plays the role of identification from a distance, in front; the image from the camera helps to predict the appearance of the object approaching the turn of the blind based on the light at the turn; In addition, images from the cameras are also processed and analyzed into different spatial regions in the surrounding environment recognition algorithm, including: walkable area (roadway), non-walkable area, objects in the surrounding area, other objects (people, cars, motorbikes, bicycles, animals, . . . );

Front ultrasonic and lidar distance sensors: play the role of identification in close range; Data from the ultrasonic and lidar distance sensors are aggregated and analyzed to ensure good control of the space ahead, at a close distance, ensuring the vehicle does not collide with other objects;

Ultrasonic distance sensor on the left and right of the vehicle: plays the role of recognizing the space on either side of the vehicle, helping to control blind spots that are outside the visible area of the camera, helping the vehicle to recognize in the event of an object moving parallel to the vehicle;

Rear camera: play the role of identification from a distance behind; The image from the camera is processed and to identify objects (people, cars, motorcycles, bicycles, animals, . . . ), ensuring the vehicle does not intersect the direction of movement of other vehicles in the event vehicle needs to change lanes or change direction;

rear ultrasonic distance sensor: plays the role of determining the rear short range distance; data from the ultrasonic distance sensors is analyzed to ensure good control of the rear space, at a close distance, to ensure that the vehicle does not collide with other objects. Data from the sensors is processed by the vehicle's safety control algorithm and thereby helps the vehicle to move safely in narrow roads.

According to the next aspect, this invention provides a narrow road safety control system for self-driving delivery vehicles in which:

the software to support safe driving when traveling in narrow roads gives driver assistance control signals according to scenarios corresponding to predicted traffic situations at intersections; then, when the vehicle has entered the intersection, the traffic situation at the intersection is redefined, next, the vehicle can control to brake completely or accelerate through the intersection according to the programmed scenario for the situation; Specifically, if at the next intersection, the vehicle predicts that there will be no moving objects to cross, the vehicle will simply flash its lights, warn the horn, enter the middle lane before the turn and slow down; however, if it determines that there is danger due to a moving object about to pass, the vehicle warns with a signal of horn, lights, slows down, moves to the appropriate edge of the road to avoid the object and is ready to stop to give way to the passing object.

According to the next aspect, this invention provides a narrow road safety control system for self-driving delivery vehicles in which:

self-driving delivery vehicles are equipped with a safety control system when traveling in narrow roads, in which the control software is divided into three functional blocks including the main self-driving function, safety control function and route finding function; these functions have different execution priority; main self-driving function has the lowest priority; the route finding function has a higher priority than the main self-driving function; and the safety control function has the highest enforcement priority; self-driving function is used to control the speed and steering angle when traveling in case of a normal travel, the vehicle uses this function to move along the lane and adjust the speed to suit each route;

the navigation function has a higher priority than the self-driving function; when the vehicle receives the starting and ending point coordinates, the route finding function will rely on the previously built map and the current traffic situation to calculate the most optimal route; In case the self-driving function cannot make decisions at intersections, the navigation function will intervene and coordinate with the self-driving function to direct the vehicle along the calculated route;

safety control function for the vehicle has the highest priority, vehicle detects the number and position of objects in its surroundings by combining information including: depth images from stereo cameras, signals from ultrasonic distance sensors, lidar scanning sensors, sound sensors, light analysis in camera images; Thanks to these signals, the vehicle can perceive the surrounding space and predict traffic situations, and emit lights and horns to warn when necessary.

As soon as it receives a delivery request, the vehicle will move from its current location to the seller's pickup location, and then move to the buyer's address.

The process of software execution takes place as follows:

Determine the path by signal from GPS: after determining the starting point and ending point, the software will find the path connecting from the starting point and ending point thanks to the optimal route finding algorithm.

while moving on the road, the vehicle uses the main self-driving algorithm to determine the steering angle thanks to the camera, by determining the road that can be traveled, the obstacles ahead. The speed of the vehicle will depend on the number of obstacles and the width of the travelable area. When the number of obstacles is large or the navigable area is small (recognized by the camera image processing algorithm), the vehicle will slow down.

During travel, the safety control system works independently of the main self-driving system to ensure that there is no collision with any objects on the road, and no collision when passing through intersections and blind turns; When it detects objects that are close and cannot be avoided, the system will immediately stop the vehicle and possibly activate the route finding feature to find another path.

With static obstacles, the vehicle will recognize and avoid from a distance. With obstacles or vehicles appearing suddenly at a close distance, the safety control system will work to steer or brake, reduce speed to avoid collision.

When traveling on narrow roads with intersections and turns out of sight, the vehicle will predict the traffic situation at the turn by using sound sensors and images from cameras to predict the movement of objects appearing or being hidden at the intersection. At the same time, the vehicle will issue warning signals in the form of lights and horns when approaching the turn.

Thus, the vehicle has 3 layers of safety calculations: class 01 avoids collisions from a long distance thanks to image processing to identify objects and steer appropriately; class 02 uses ultrasonic and lidar sensors to find surrounding obstacles, if it is too close ahead, the vehicle will automatically stop, and class 03 predicts traffic situations that occur at intersections or turns out of sight.

The invention claimed is:

1. A narrow road safety control system for a self-driving delivery vehicle includes:

hardware comprising an embedded computer connected to a sensor system and lights and horns; the sensor system helps the self-driving delivery vehicle recognize its surroundings; the lights and horns provide warning signals to other vehicles; the sensor system consists of ultrasonic distance sensors, lidar scanning sensors, at least two stereo cameras and sound sensors;

an ambient safety control processor configured to allow the self-driving delivery vehicle to know important information about a surrounding environment, including an area which the vehicle can travel, a location of surrounding objects, a speed of objects in traffic, and a predicted direction of their movement; when detecting objects with a first distance that cannot be avoided, the system will immediately stop the vehicle; with static obstacles, the vehicle will recognize and avoid from a distance; with obstacles or vehicles appearing suddenly at a second distance, the ambient safety control processor will also give a steering signal; the ambient safety control module works independently of a main self-driving computer and it has higher priority to ensure traffic safety;

a processor configured to predict a traffic situation at a blind turn; object moving a third distance from a blind turn is predicted based on sounds and lights the object emits; this prediction is verified when the self-driving delivery vehicle begins to enter an intersection using images from the cameras and ultrasonic distance sensors and lidar sensors; signals from sound sensors and the images from the cameras are processed by a deep learning algorithm to predict a moving object a fourth distance from the blind turn, so the self-driving delivery vehicle can predict the traffic situation at the turn;

a safe driver assistant processor configured to assist steering and speed control, giving warning signals by lights or horns when approaching a turn; in case of a wrong prediction at the turn, the system actively makes decisions in accordance with reality to ensure traffic safety; an appropriate speed and steering angle are re-calculated, if necessary, the self-driving delivery vehicle can fully brake to give way to moving objects at the turn;

a warning circuit configured to operate when the vehicle stops for delivery at the delivery point, the vehicle stops within a fifth distance from the curb and turns on flashing lights to warn other traffic vehicles, where the sensors system includes:

a sound sensor that provides signals to predict a hidden object, distance to turn, speed and direction of travel when the self-driving delivery vehicle approaches a blind turn based on analysis of sound type and its change;

a front camera cluster for identification from a distance, in front of the self-driving delivery vehicle; images from the front camera cluster helping to predict the appearance of objects approaching the blind turn based on a light at the turn, and to verify the prediction when the self-driving delivery vehicle has entered the intersection; images from the front camera cluster are also processed and analyzed into different spatial regions in a surrounding environment recognition algorithm, including: a walkable area of a roadway, a non-walkable area, objects in the surrounding area, other objects;

a front ultrasonic and lidar distance sensors for providing identification in close range; data from the front ultrasonic and lidar distance sensors are aggregated and analyzed to ensure good control of a space ahead, at a sixth distance, ensuring the self-driving delivery vehicle does not collide with other objects;

an ultrasonic distance sensor on a left side and a right side of the self-driving delivery vehicle for recognizing the space on either side of the vehicle, helping to control blind spots that are outside a visible area of the camera, helping the vehicle recognize in the event of an object moving parallel to the self-driving delivery vehicle;

a rear camera for identification from a distance behind the self-driving delivery vehicle; an image from the camera is processed to identify, ensuring the self-driving delivery vehicle does not intersect the direction of movement of other vehicles in the event the self-driving delivery vehicle needs to change lanes or change direction;

a rear ultrasonic distance sensor for determining a rear short range distance; data from the rear ultrasonic distance sensors is analyzed to ensure good control of a rear space, within a seventh distance, to ensure that the self-driving delivery vehicle does not collide with other objects; data from the sensors is processed by the vehicle's safety control algorithm and thereby helps the self-driving delivery vehicle to move safely in narrow roads.

2. The narrow road safety control system for a self-driving delivery vehicle according to claim 1, where the objects comprise people, cars, motorbikes, bicycles, or animals.

3. The narrow road safety control system for a self-driving delivery vehicle according to claim 1, in which:

the safe driver assistant processor, when traveling in narrow roads, gives driver assistance control signals according to scenarios corresponding to predicted traffic situations at intersections; then, when the self-driving delivery vehicle has entered the intersection, the traffic situation at the intersection is redefined, next, the self-driving delivery vehicle can control to brake completely or accelerate through the intersection according to the programmed scenario for the situation.

4. The narrow road safety control system for a self-driving delivery vehicle according to claim 1, in which:

the ambient safety control module is divided into two functional blocks including a safety control function and a route finding function; these functions have different execution priority; the safety control function has a higher priority than the route finding function;

when the self-driving delivery vehicle receives starting and ending point coordinates, the route finding function will rely on a previously built map and a current traffic condition to calculate an optimal route; in case the main self-driving function cannot make decisions at intersections, the navigation function will intervene and coordinate with the main self-driving function to direct the vehicle along the calculated route;

the self-driving delivery vehicle detects a number and position of objects in its surroundings by combining information including depth images from stereo cameras, signals from ultrasonic distance sensors, lidar scanning sensors, sound sensors, light analysis in camera images; whereby the vehicle can perceive the surrounding space and predict traffic situations, and emit lights and horns to warn when necessary.

* * * * *